United States Patent Office.

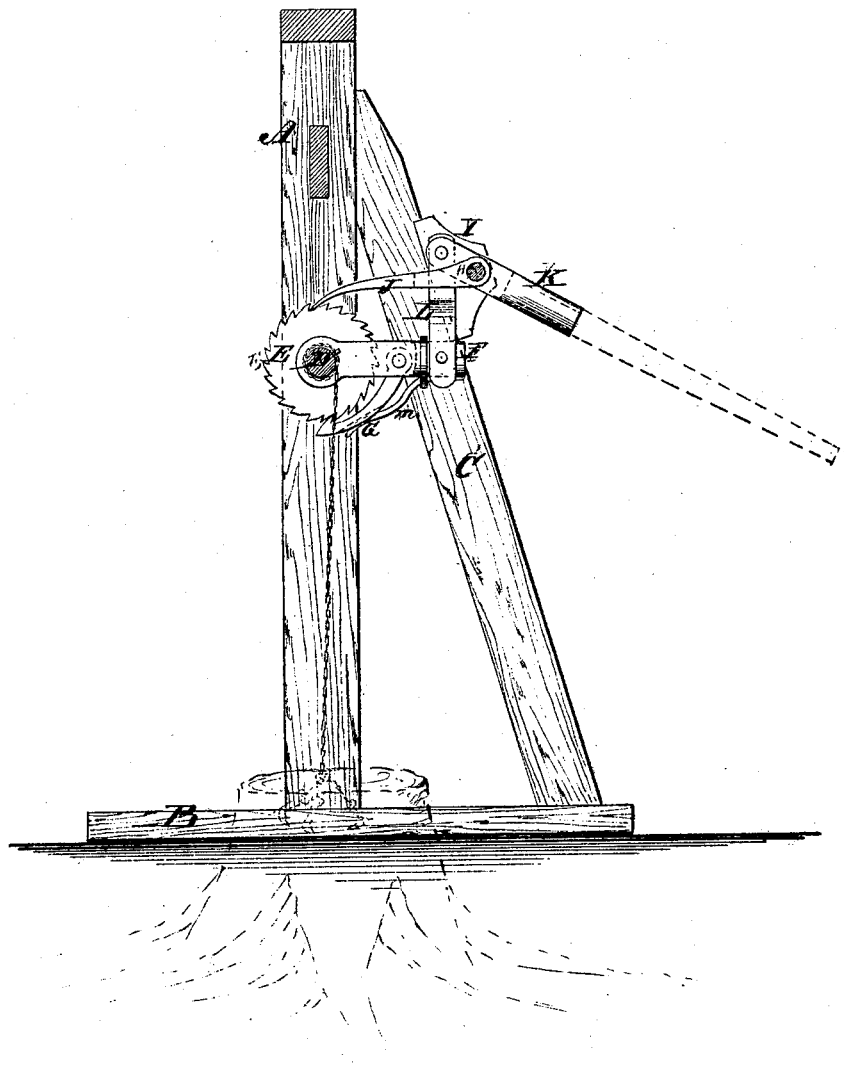

WILLIAM SMITH, OF TOMAH, ASSIGNOR TO HIMSELF AND HERMAN GREVE, OF SPARTA, WISCONSIN.

Letters Patent No. 109,466, dated November 22, 1870.

IMPROVEMENT IN STUMP-EXTRACTORS.

The Schedule referred to in these Letters Patent and making part of the same.

*To all whom it may concern:*

Be it known that I, WILLIAM SMITH, of Tomah, in the county of Monroe and State of Wisconsin, have invented a new and useful Improvement in Stump-Extractors and other Machines; and I do hereby declare that the following is a full, clear, and exact description thereof, which will enable others skilled in the art to make and use the same, reference being had to the accompanying drawing forming part of this specification.

The object of this invention is to furnish an apparatus for extracting stumps and other purposes, which shall be simple and durable and effective in operation; and It consists in the mode of revolving the winding-shaft or drum, as hereinafter described.

The accompanying drawing represents a sectional elevation of a stump-machine, showing the ratchet-wheel on the shaft of the drum, and the compound lever arrangement by which it is operated.

A is a gallows-frame, supported on sill-pieces, B, by the bars C.

D is the drum-shaft, upon which the ratchet-wheel E is fastened.

F represents a lever whose fulcrum is on the shaft D.

G is a hooked spring-pawl attached to the lever F. This is the working pawl, and revolves the shaft by pulling as the lever F is raised.

H is a transverse-shaft, supported in boxes, I, on the braces C.

J is a holding-pawl, which hangs loosely on this shaft and engages with the ratchet-wheel to prevent any counter-movement of the drum.

K is a lever, which works on this shaft for a fulcrum, connected with the lever F by the crotch-connection L.

By this arrangement of the levers F and K it will be seen that a compound lever purchase is obtained by using the lever K, which lever I designate the "power-lever."

The lever F is called the "speed-lever."

The hook-pawl G is pressed upward to its work by the spring m.

A powerful purchase for raising large stumps or other weights is obtained by using the power-lever. A less purchase is obtained by working the lever F direct.

The parts F and K, designated levers in the drawing, are in fact lever-sockets, the power-lever extended is seen in dotted lines.

This ratchet and lever-pawl arrangement is adapted to other purposes than that to which I hereby apply it, as, for instance, cotton and other presses, and for raising heavy weights. I do not, therefore, confine myself to stump-extractors exclusively, but design to apply the movement to all the purposes to which it is adapted.

Having thus described my invention,

What I claim as new, and desire to secure by Letters Patent, is—

The relative arrangement on the frame of lever-sockets K H, pawls J G, straps L, and boxes I, as and for the purpose specified.

WILLIAM SMITH.

Witnesses:
W. C. NYE,
GEO. J. Y. SMITH.